(12) United States Patent
Rooke

(10) Patent No.: US 7,952,702 B2
(45) Date of Patent: May 31, 2011

(54) DEVICE AND SYSTEM FOR EVALUATING A LENS FOR AN ELECTRONIC DEVICE

(75) Inventor: David John Rooke, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/603,990

(22) Filed: Oct. 22, 2009

(65) Prior Publication Data

US 2010/0039639 A1 Feb. 18, 2010

Related U.S. Application Data

(63) Continuation of application No. 11/463,495, filed on Aug. 9, 2006, now Pat. No. 7,639,353.

(51) Int. Cl.
*G01N 21/00* (2006.01)

(52) U.S. Cl. ............... 356/239.2; 356/239.1; 356/237.3; 250/559.4; 250/559.49; 349/113; 349/187

(58) Field of Classification Search .... 356/239.1–239.5, 356/237.1–237.3; 250/559.4–559.49; 349/113, 349/187, 192

See application file for complete search history.

(56) References Cited

U.S. PATENT DOCUMENTS

| | | | |
|---|---|---|---|
| 4,876,121 A | 10/1989 | Cohen | |
| 5,764,209 A | 6/1998 | Hawthorne et al. | |
| 5,812,260 A | 9/1998 | Louisnathan | |
| 5,847,822 A | 12/1998 | Sugiura et al. | |
| 6,191,850 B1 | 2/2001 | Chiang | |
| 6,195,164 B1 | 2/2001 | Thompson et al. | |
| 6,556,286 B1* | 4/2003 | La Fontaine et al. | 356/239.2 |
| 7,166,856 B2 | 1/2007 | Cho et al. | |
| 7,586,323 B2* | 9/2009 | Kang et al. | 324/770 |
| 2002/0071111 A1 | 6/2002 | Epstein | |
| 2003/0700000 | 6/2003 | Weyer et al. | |
| 2006/0017676 A1 | 1/2006 | Bowers et al. | |
| 2006/0110580 A1* | 5/2006 | Aylward et al. | 428/172 |
| 2007/0046321 A1 | 3/2007 | Kang et al. | |

FOREIGN PATENT DOCUMENTS

EP 1 061 329 A2 12/2000

\* cited by examiner

*Primary Examiner* — Gregory J Toatley
*Assistant Examiner* — Iyabo S Alli
(74) *Attorney, Agent, or Firm* — McCarthy Tétrault LLP

(57) ABSTRACT

The disclosure relates to a system and device for evaluating imperfections in a lens for a display for an electronic device. The evaluation device comprises: a substrate; and a pattern imposed on the substrate. The pattern comprises a series of lines in a grid imposed on the substrate wherein when the pattern is viewed through the lens, the series of lines having thickness of between approximately 10 and approximately 150 microns, spaced in intervals between approximately 20 microns and approximately 300 microns from center to center, the pattern is distorted around an area where a defect is present in the lens. With the device, the lens is identifiable as being defective if the pattern appears as a moiré distortion in the area when viewed through the lens.

18 Claims, 6 Drawing Sheets grid 302 substrate 300

Not to scale, each line width in grid 302 is 50 microns, spacing between lines is 100 microns, center to center.

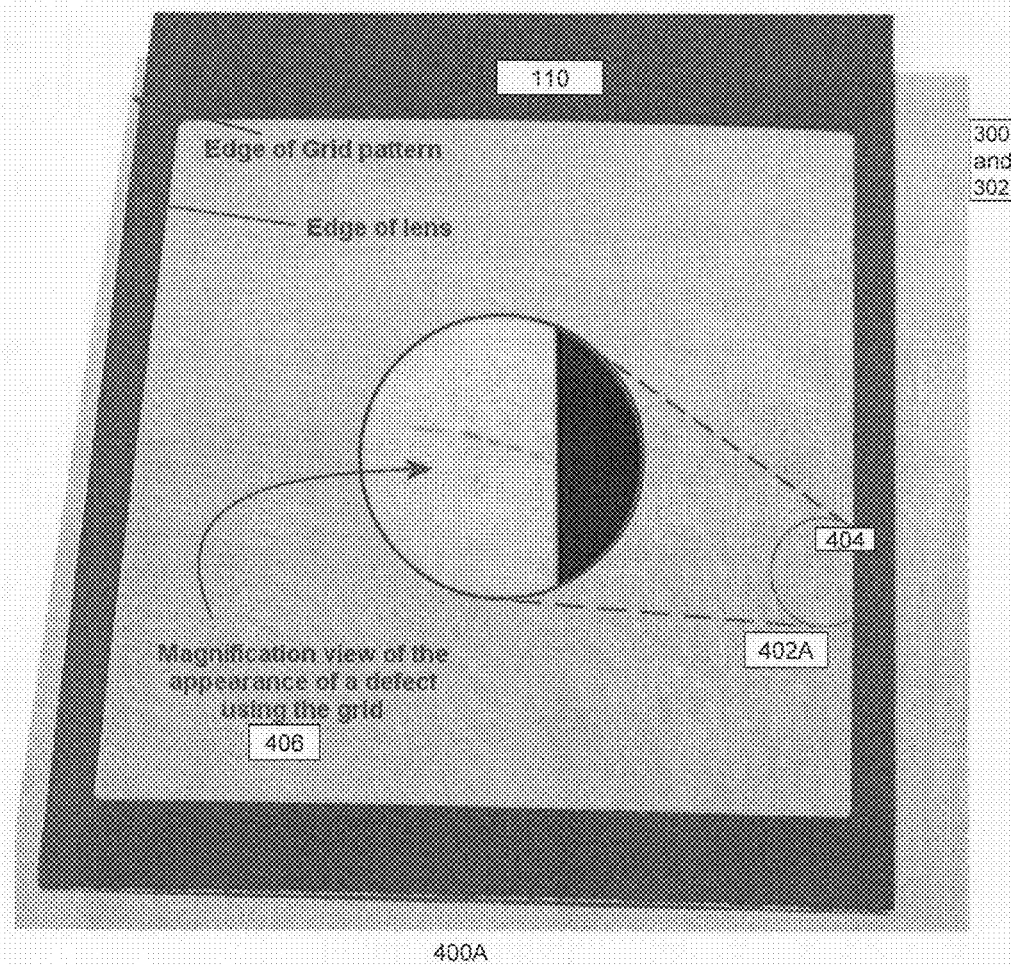

Not to scale, each line width in grid 302 is 50 microns, spacing between lines is 100 microns, center to center.

DEVICE AND SYSTEM FOR EVALUATING A LENS FOR AN ELECTRONIC DEVICE

This application is a continuation application of U.S. patent application Ser. No. 11/463,495 filed on Aug. 9, 2006U.S. Pat. No. 7,639,353.

FIELD OF DISCLOSURE

The disclosure relates to a device and system for evaluating a lens for a display in an electronic device, in particular a display lens of a communication device, such as a portable phone.

BACKGROUND

A typical voice communication device, such as a cellular phone, has a display therein, which is frequently a liquid crystal display (LCD). As is known in the art, an LCD is comprised of a liquid crystal substance sandwiched between an upper and lower plate of generally thin glass.

The layout of a display in a communication device frequently has a lens provided over the LCD. The lens provides a physical cover for the upper plate of glass of the top of the LCD itself. The lens can be thicker than LCD's glass top, thereby providing protection from when external downward pressure applied to the upper surface of the LCD.

However, the lens introduces additional visual interface between the LCD and the viewer. This can lead to distortions to the LCD if there are optic defects in the lens. As the lens is typically clear, it is difficult to determine when a lens is defective, until it is installed into a device and the LCD is activated. This is inefficient for the manufacturing process.

There is a need for a system and method to evaluate such lenses prior to installation to a device which provides an improvement over the prior art and the viewer.

BRIEF DESCRIPTION OF THE DRAWINGS

The foregoing and other aspects of the disclosure will become more apparent from the following description of specific embodiments thereof and the accompanying drawings which illustrate, by way of example only, the principles of the disclosure. In the drawings, where like elements feature like reference numerals (and wherein individual elements bear unique alphabetical suffixes):

FIG. 4A is a schematic of an exemplary distortion pattern seen through a lens having a defect when the grid of FIG. 3 is placed underneath;

DETAILED DESCRIPTION OF AN EMBODIMENT

Figure 1:
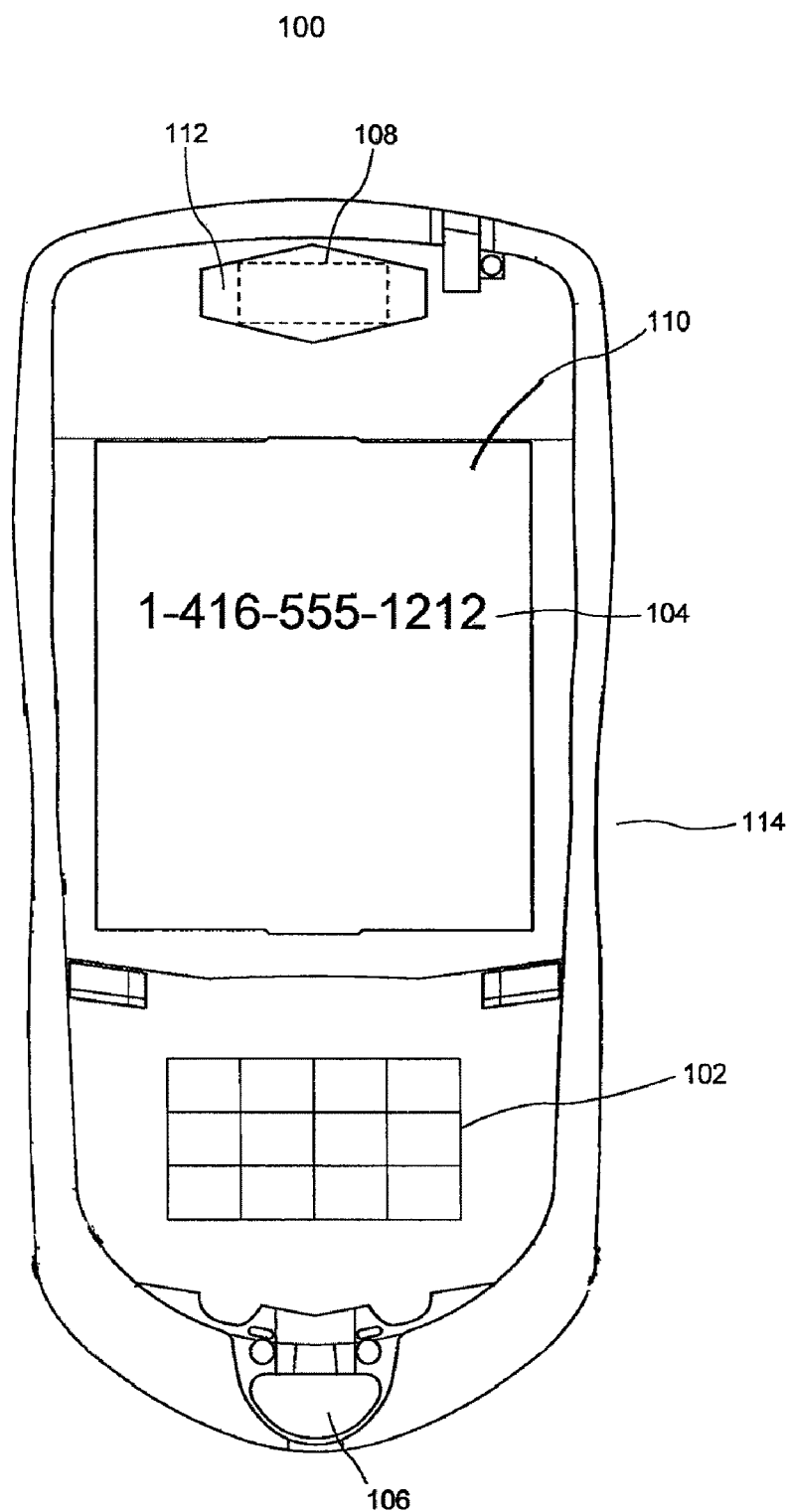
FIG. 1 is a top plan view of a communication device having a liquid crystal display (LCD) and a lens that may be evaluated according to embodiment of the disclosure.

The description which follows, and the embodiments described therein, are provided by way of illustration of an example, or examples, of particular embodiments of the principles of the present disclosure. These examples are provided for the purposes of explanation, and not limitation, of those principles and of the disclosure. In the description, which follows, like parts are marked throughout the specification and the drawings with the same respective reference numerals.

In a first aspect, an evaluation device for visually identifying imperfections in a lens for mounting in a case to cover a display of an electronic device is provided. The evaluation device comprises: a substrate; and a pattern imposed on the substrate. The pattern comprises a series of lines in a grid imposed on the substrate wherein when the pattern is viewed through the lens, the series of lines having thickness of between approximately 10 and approximately 150 microns, spaced in intervals between approximately 20 microns and approximately 300 microns from center to center, the pattern is distorted around an area where a defect is present in the lens. With the device, the lens is identifiable as being defective if the pattern appears as a moiré distortion in the area when viewed through the lens.

With the device, the lens may be suitable for mounting in the case if the pattern appears to be a grey color when viewed through the lens.

In the device, the substrate may be comprised of one of a transparent material, an opaque material in a light colour; and the series of lines may be shown in a dark colour.

In the device, the substrate may be comprised of one mylar, glass or plastic.

In the device, the series of lines may be a grid having lines approximately 50 microns thick, spaced in approximately 100 micron intervals from center to center.

In a second aspect, an evaluation device for visually identifying imperfections in a lens for mounting in a case to cover a display of an electronic device is provided. The evaluation device comprises: a substrate; and a pattern imposed on the substrate. The pattern comprises a series of geometric shapes, each having dimensions of between approximately 10 to approximately 150 microns the pattern is distorted around an area where a defect is present in the lens. With the device, the lens is identifiable as being defective if the pattern appears as a moiré distortion in the area when viewed through the lens.

With the device, the lens may be suitable for mounting in the case if the pattern appears to be a grey color when viewed through the lens.

In the device, the substrate may be comprised of one of a transparent material, an opaque material in a light colour; and the series of geometric shapes may be shown in a dark colour.

In a third aspect, an evaluation system to visually evaluate a lens that mounts in a case to cover a display of an electronic device for imperfections is provided. The system comprises: an evaluation table for the lens, the table having a mounting area for an evaluation substrate; and the substrate having a pattern imposed thereon wherein when the pattern is viewed through the lens, the pattern is seen to be distorted around an area where a defect is present in the lens. With the system, the lens is identifiable as being defective if the pattern appears as a moiré distortion in the area when viewed through the lens.

With the system, the lens may be identifiable as being suitable for mounting in the case if the pattern appears to be a grey color when viewed through the lens.

The system may further comprise: a light mounted within the table to provide backlighting for the substrate; and a guide rail system for the lens to place the lens above the mounting area.

The system may further comprise a conveyor for the lens to selectively transport the lens to and from the mounting area.

In the system, the substrate may be comprised of a transparent material; and the pattern may be a series of lines shown in a dark colour.

In the system, the series of lines may be a grid having lines having thickness of between approximately 10 to approximately 150 microns and the lines may be spaced between approximately 20 to approximately 150 microns apart.

In the system, the pattern may be a series of geometric shapes, each having dimensions of between approximately 10 to approximately 150 microns.

In another aspect of an embodiment, an evaluation device for visually identifying imperfections in a lens for a display for an electronic device is provided. The evaluation device comprises: a substrate; and a pattern imposed on the substrate. For the pattern, when the pattern is viewed through the lens, the pattern is distorted around an area where a defect is present in the lens. As such, the device assists in visually identifying imperfections in the lens when the substrate is positioned relative to the lens to enable the pattern to be viewed through the lens.

In the device, the substrate may be comprised of a transparent material and the pattern may be a series of lines shown in a dark colour. Further, the series of lines may be a grid having lines approximately 50 microns thick, spaced in approximately 100 micron intervals from center to center. Alternatively, the grid may have lines having thickness of between approximately 10 to approximately 150 microns, spaced in intervals between approximately 20 microns to approximately 300 microns from center to center.

Alternatively, the substrate may be comprised of an opaque material in a light colour; and the pattern may be a series of lines shown in a dark colour. Further, the series of lines may be a grid having lines approximately 50 microns thick, spaced in approximately 100 micron intervals from center to center. Alternatively, the grid may have lines having thickness of between approximately 10 to approximately 150 microns, spaced in intervals between approximately 20 microns to approximately 300 microns from center to center.

The pattern may be a series of geometric shapes, each having dimensions of between approximately 10 to approximately 150 microns.

In yet another aspect, a system to evaluate a lens for a display for an electronic device for imperfections is provided. The system comprises: an evaluation table for the lens, the table having a mounting area; and a substrate for mounting on the mounting area, the substrate having a pattern imposed thereon wherein when the pattern is viewed through the lens, the pattern is noticeably distorted around an area where a defect is present in the lens.

The system may further comprise: a light mounted within the table to provide backlighting for the substrate; and a guide rail system for the lens to place the lens above the mounting area.

The system may further comprise a conveyor for the lens to selectively transport the lens to and from the mounting area.

In the system, the substrate may be comprised of a transparent material; and the pattern may be a grid shown in a dark colour. Further, the grid may have lines having thickness of between approximately 10 to approximately 150 microns spaced in intervals between approximately 20 microns to approximately 300 microns from center to center.

In still a further aspect, a method for evaluating a lens for a display for an electronic device for imperfections is provided. The method comprises: placing the lens under evaluation over an evaluation substrate having an evaluation pattern; examining an image of the test pattern appearing through the lens for a distortion in the pattern; and identifying the lens as defective is the distortion is found. In the method, the pattern comprises a series of lines having a thickness of approximately 50 microns.

In the method, the series of lines may be a grid having lines having thickness of between approximately 10 to approximately 150 microns and the lines may be spaced between approximately 20 to approximately 150 microns apart.

In other aspects, various subsets and combinations of the above noted aspects are provided.

Generally, an embodiment provides a system, method and device for evaluating a lens prior to installing the lens in an electronic device. For each, a substrate is provided having a finely impressed pattern provided thereon. When a lens is placed over the substrate, the pattern viewed through the lens can be viewed for any distortions in its image. If a significant or noticeable distortion is viewed and visually identified, then a distortion is present in the lens and it should be rejected and should not be installed into a device. Various patterns and substrates can be provided.

Referring to FIG. 1, communication device 100 is shown. In the embodiment, communication device 100 provides voice communications with other devices, allowing the user to hear audio signals (e.g. voices) transmitted from another device (e.g. a cellular phone). Device 100 may be a telephone, a cordless telephone, a cellular telephone, a voice-enabled personal digital assistant (PDA) or any other voice communication device. Communications may be provided via wireless systems, wired systems or a combination of both systems. As is common with voice communication devices, device 100 has a keypad 102, display 104, microphone 106 and transducer 108, i.e. speaker 108, all contained within an enclosure. Display 104 is an LCD device. Display lens 110 provides a transparent, translucent or non-opaque physical cover for the viewing area of display 104 and extends beyond it. Speaker cover 112 covers a recess in display lens 110. The recess is located above the installation location of speaker 108. Case 114 provides a physical enclosure for the electronics and mechanical elements for device 100. General internal circuits and operations of device 100 are well known in the art and are not provided here.

Device 100 provides voice communications for a user in a familiar compact form factor. To initiate a call, the user activates device 100, enters a telephone number to be called on keypad 102 and initiates the call.

Figure 2:
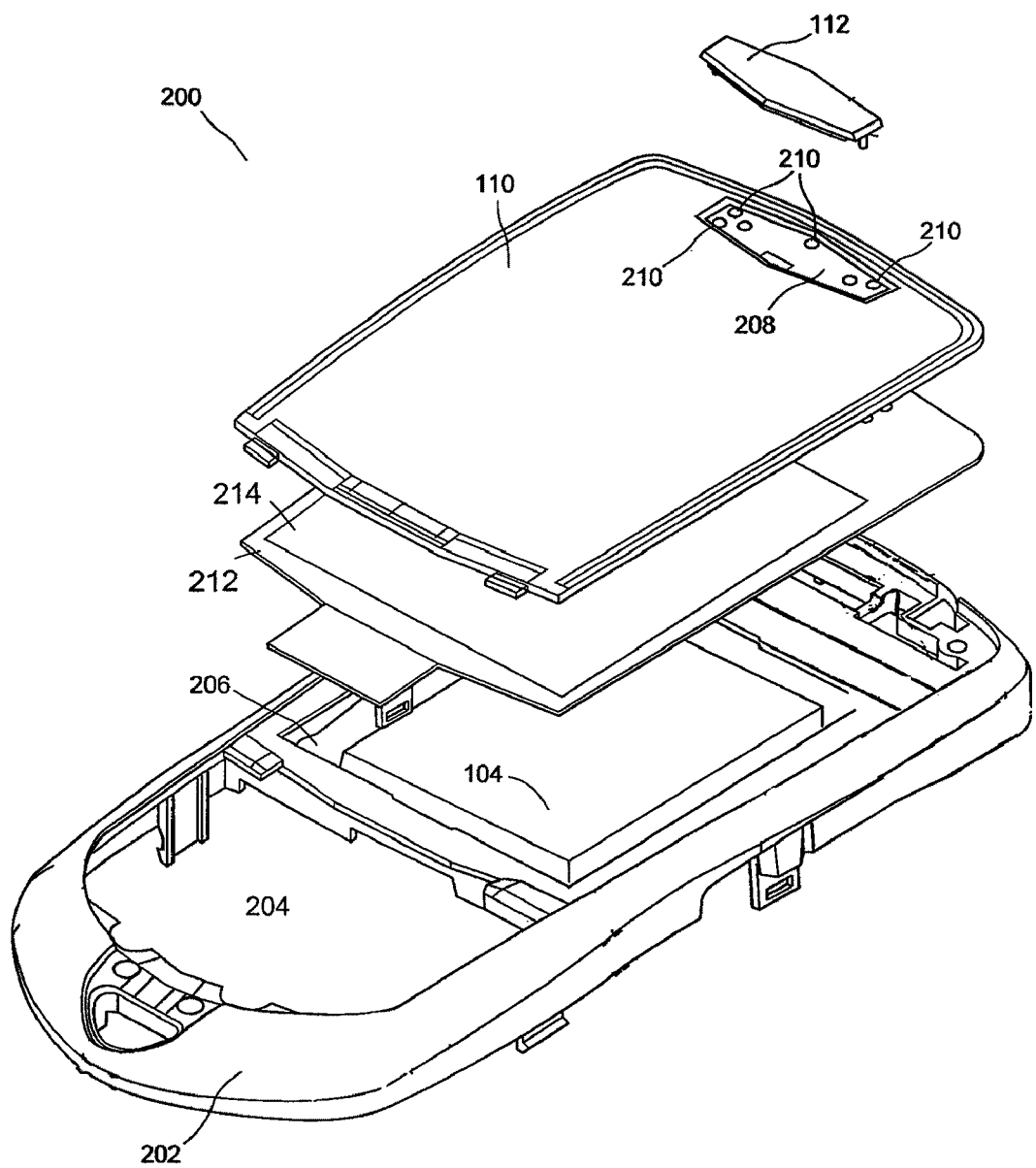
FIG. 2 is a top exploded perspective view of selected internal components including the LCD display and the lens of the communication device of FIG. 1.

Referring to FIG. 2, view 200 provides an exploded top perspective view of internal and external elements in an upper portion of device 100. In particular, case 114 is comprised of top case section 202 and a bottom case section (not shown). Top case section 202 provides a one-piece cover for internal elements of device 100. Top case section 202 mates with the bottom case section along their respective sides. Various dimensions and fitting interfaces between top case section 202 and bottom case section may be provided in other embodiments, including those known in the art. Generally, top case section 202 is shaped to define the front face of device 100 and the top portion of the exterior edge of case 114. Top section 202 also provides internal bracing for structural support for device 100 and has two openings in its front face: opening 204 allows access to keypad 102 and opening 206 allows viewing of LCD 104. Top case section 202 is preferably a plastic moulded injected casing.

Display area of LCD 104 is covered by display lens 110. Display lens 110 further extends upwardly above LCD 104 to the top edge of case section 202. As such, display lens 110 provides a single seamless structure to cover both LCD 104 and speaker 108. Advantageously, display lens 110 may be silk screened with custom lettering or graphics around display area of LCD 104 and around the area where speaker 108 is located. Display lens 110 may be made of almost any material (such as plastic), as long as the material facilitates accurate manufacturing of display lens 110 and provides a transparent, translucent or non-opaque region where display 104 will be placed underneath. Other sizes, shapes and thicknesses of lens 110 can be provided to fit dimensions of a particular display 104.

Further detail is provided on the acoustic interface between speaker 108 and display lens 110. At a top region of display lens 110, recess 208 is provided, which is a shaped contour extending inwardly within display lens 110. In the embodiment, recess 208 is a hexagonal polygon depression having a generally stunted-hexagonal shape. The floor of recess 208 is generally flat. The exterior edges of recess 208 are bevelled downward to the floor. In other embodiments, other shapes may be provided for a recess. Recess 208 has four sound holes 210 therein which provide air conduits through display lens 110. As such, holes 210 allow passage of acoustic energy from speaker 108 through display lens 110 to the ambient environment outside device 100. Speaker cover 112 is shaped to fit within recess 208. As such in the embodiment, cover 112 is a stunted hexagonal shape. Speaker cover 112 provides a cover for sound holes 210, thereby enhancing the aesthetic appearance of display lens 110.

In order to secure display lens 110 to case section 202, adhesive display cover tape 212 is provided and is located between LCD 104 and display lens 110. Display cover tape 212 has double-sided adhesive thereon to affix its top surface to the bottom surface of display lens 110 and to affix its bottom surface to the top surface of case section 202. Display cover tape 212 is excised in area 214 so as to not obstruct view of LCD 104. For aesthetics, cover tape 212 is black, which enhances concealing of plastics elements beneath it and outlining of the display area of LCD 104. Display cover tape 212 has a transparent layer attached in area 214. After attaching tape 212 to display lens 110, the transparent layer is removed using a pull tab.

While the embodiment defines display lens 110 as being generally rectangular, in other embodiments, the display cover can be any shape and size, as long as it covers both the display region and the speaker of the communication device. Further, if the display and the speaker are not on the same face of a device, the display cover can be shaped to bend at the interface line between the two faces and cover both the display and the speaker.

In one embodiment lens 110 provides a thicker transparent or tinted window covering LCD 104. One type of lens 110 provides no visual magnification of LCD 104. In other embodiments a lens may be formed to provide magnification over one or more regions of LCD 104. Lens 110 may be manufactured from a clear polycarbonate, such as Lexan (trademark). In order to limit distortions of images as light passes from LCD 104 through lens 110 to the viewer, it is preferable that lens 110 have minimal distortions therein. However, it is inevitable that during the manufacturing or shipping of lens 110, some imperfections may be imparted onto lens 110, that will impair the clarity of lens 110. Such imperfections may not be readily visible to the unaided eye, but would be apparent once the cover is installed in situ in device 100 and when LCD 104 is generating an image. For example, a straight line generated on LCD 104 may appear bent in some regions once distorted by a defective lens 110. Alternatively or moiré effects.

Figure 3:
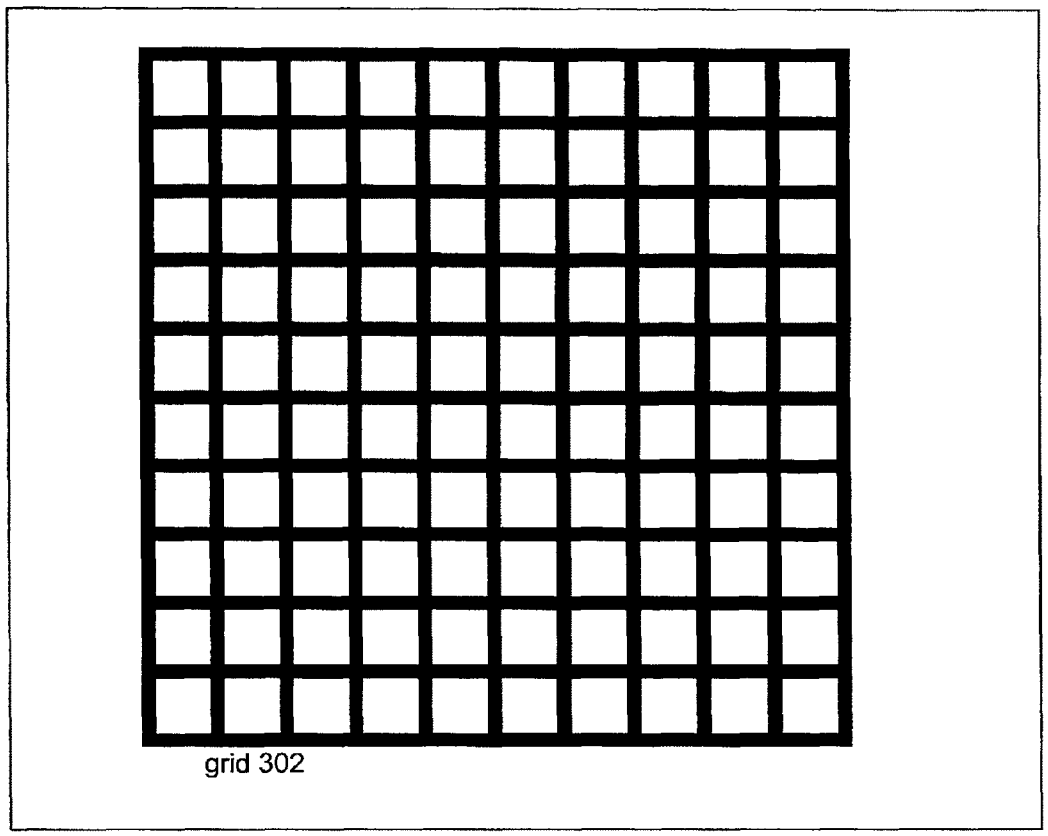
FIG. 3 is a schematic diagram of an evaluation grid used to evaluate the lens of the device of FIG. 1 according to an embodiment.

Referring to FIG. 3, to assist in evaluating lens 110 without requiring its installation into device 100, an embodiment provides a pattern 302 that is printed, etched, embossed or otherwise painted on a substrate 300 that is used to highlight an imperfection in lens 110 that would normally not be visible unless lens 110 was installed into device 100. The colour of the lines is black, however, in other embodiments; any sufficiently dark colour may be used, such as green, blue, brown or others. Substrate 300 is a clear mylar sheet; however, it can also be a bright white substrate or a rigid piece of glass or clear or bright plastic. A feature of pattern 302 as provided on the substrate is that it is visible from the background provided by the substrate. A grid may be generated using a high definition laser plotter, such as one meant for halide based film. Any suitable photo-lithographic high resolution process would be a possible alternative.

In the embodiment pattern 302 is a cross hatching grid of evenly spaced lines in evenly spaced rows and columns. The widths of each line is approximately 50 microns. The spacing between each line in each row and column is approximately 100 microns, center to center. As spacings of the lines in grid 302 are very close, to the unaided eye, the grid appears to be a grey background. The size of the grid can vary, depending on the size of lens 110 being evaluated. An exemplary grid has exterior dimensions of 9 cm×14 cm centered on a clear mylar sheet 10 cm×16 cm in size. In other embodiments, the widths may change and or the spacings may change for the lines throughout the pattern. The pattern may or may not have a symmetrical aspect to it.

Other configurations for grid 302 may be used. For example, line widths of 25 microns may be used in 25 micron spacings between exterior sides of the lines (this provides a "center-to-center" spacing of 50 microns). Similarly, line widths of 75, 100, 125, 150 microns may be used (or approximations thereof with larger or smaller dimensions allowable). For such widths, the "center to center" spacing between lines may be approximately double the thickness of the lines. This spacing provides a uniform alternation between lines and "white" spaces. The lines may be spaced in larger or smaller dimensions than their thickness. In one embodiment, all lines in grid 302 are of the same thickness and have the same spacing. In other embodiments, grid 302 may have one or more regions having different thicknesses and/or spacings of lines from other regions. Also, alternative patterns may be provided, including a pattern is a series of evenly spaced dots, forming a Benday dot arrangement, or a series of geometric shapes, such as squares, rectangles, triangles, rhombuses, circles etc. Exemplary dimensions of such geometric shapes, would be having sides in the range of 10 microns to 150 microns. Spacing of shapes would be in a similar range of dimensions.

Figure 4B:
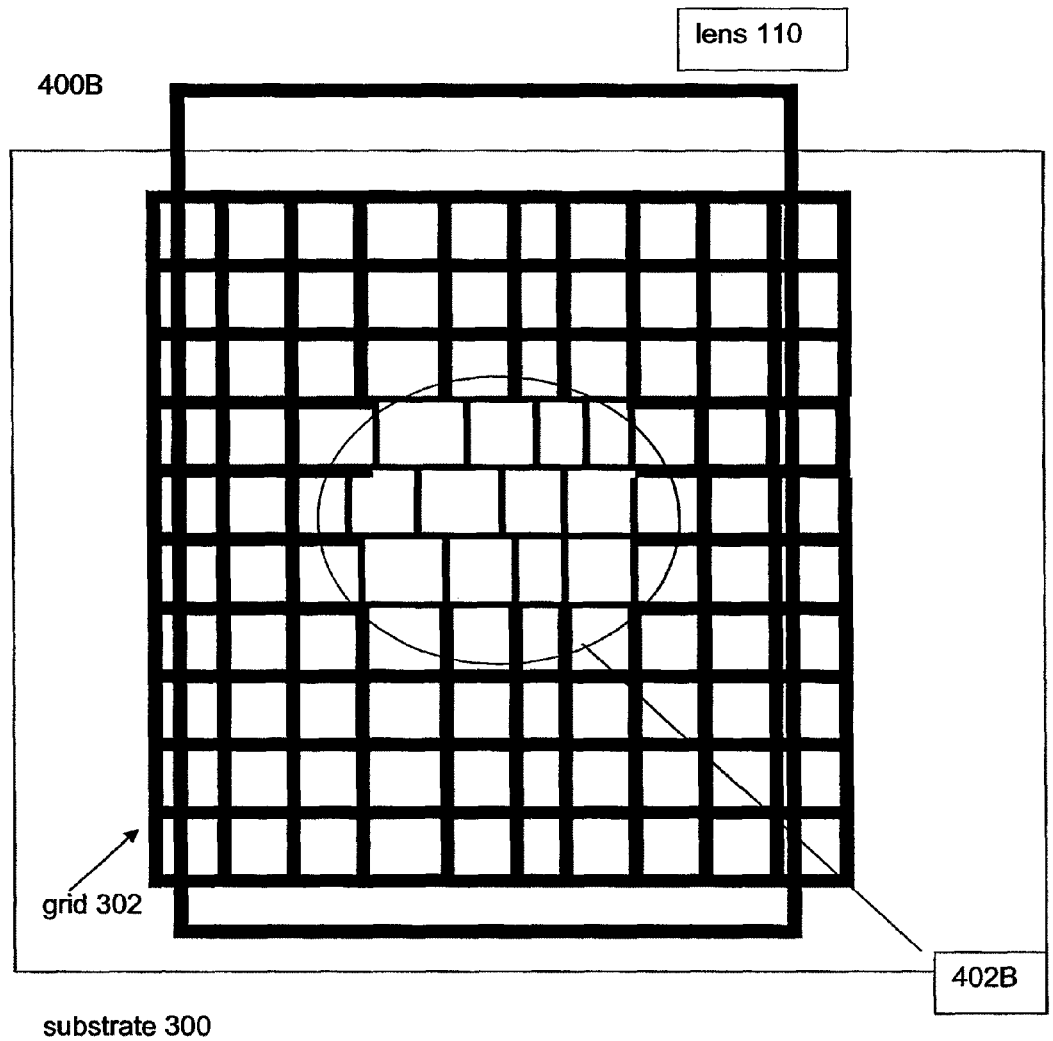
FIG. 4B is another schematic of an exemplary distortion pattern seen through a lens having a defect when the grid of FIG. 3 is placed underneath.

In use, a method for testing a lens as provided by an embodiment is as follows. First, substrate 300 is placed on a flat surface in a well-lit environment. Next, lens 110 is placed on top or is held slightly above substrate 300. An assessor evaluates the image of grid 302 appearing through lens 110 to evaluate the optical quality of lens 110. For an acceptable lens 110, when lens 110 is placed on top of the substrate 300 and the image of grid 302 is viewed therethrough, the image has no or only marginal distortions of the grid pattern 302. However, for a lens 110 that has an optic imperfection in an area, the imperfection is manifested by a distortion in the grey scale image of grid 302 seen through that area. An imperfection may be caused by almost any manufacturing/composition error, including a bulging of a thickness dimension in lens 110, an air bubble in lens 110, a foreign particular/substance trapped within lens 110, etc. An imperfection may produce almost any type of visible distortion in the grid image seen through lens 110. One type of distortion is that the grid pattern appears to change in the change of the colour from a constant (grey) hue to a moiré pattern. FIG. 4A shows layout 400A having substrate 300 with grid 302 on a flat surface with lens 110 placed upon substrate 300. In viewing image of grid 302 in area 402A through lens 110, exemplary hairline line 404 is indicative one type of defect as magnified in balloon 406, which is provided for magnification purposes for the figure. FIG. 4B in view 400B shows another exemplary visualization of a defect of an exemplary bulging of image of grid 302 when viewed through a defective lens 110 in defective region 402B (circled for illustrative purposes). If a notable imperfection is found in the image, then the lens is rejected. If no significant imperfection is found, the lens may be accepted and eventually installed into a device. It will be appreciated that other manifestations of defects may be provided when viewing a lens.

For the method, lens 110 may be held above substrate 300 as well. If substrate 300 is transparent, then backlighting may be used, such as lighting from a light table. If substrate 300 is opaque, then ambient lighting from above lens 110 can be used.

Figure 5:
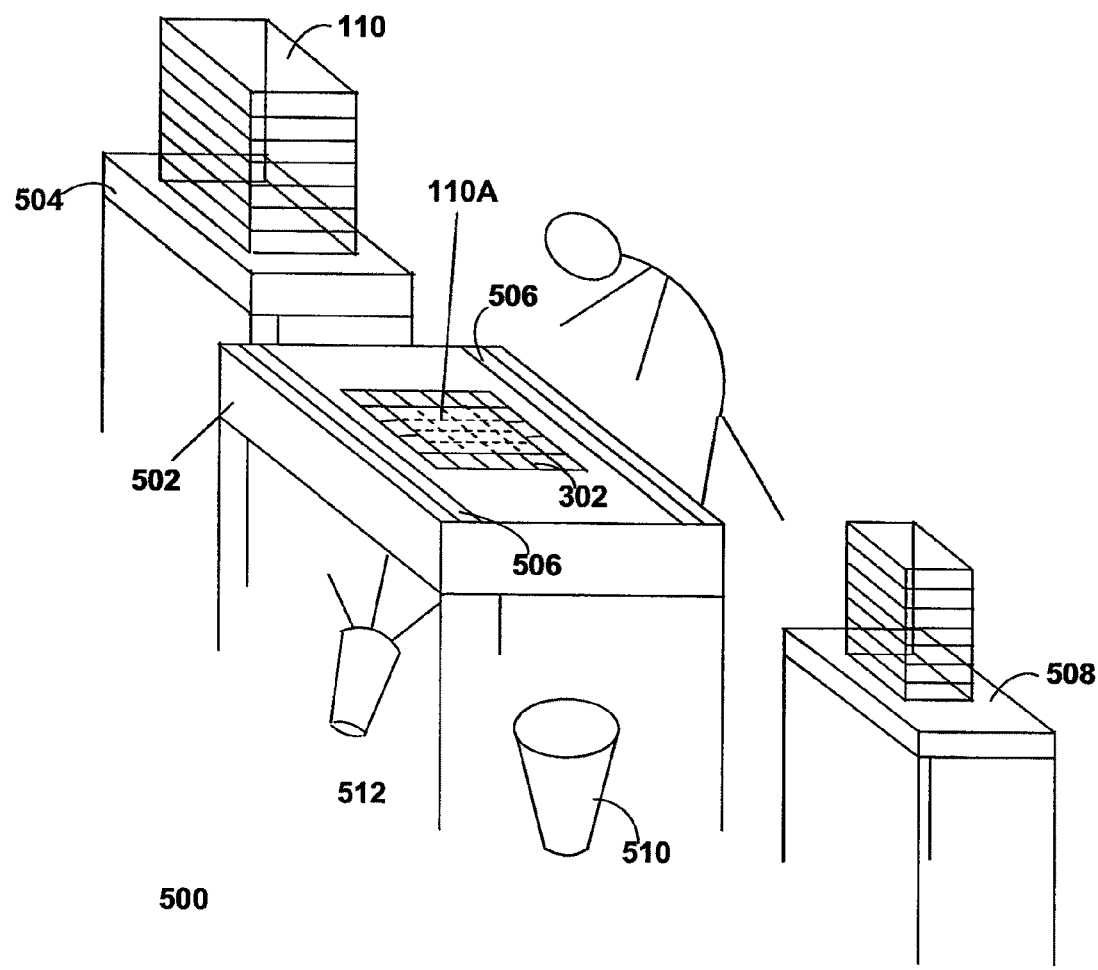
FIG. 5 is a block diagram of an evaluation system utilizing the grid of FIG. 3 for evaluating a lens of the device of FIG. 1 according to an embodiment.

Referring to FIG. 5, in another embodiment, an automated jig and evaluation station 500 may be implemented where a light table 502 has grid 302 mounted on its upper surface. An evaluation method as described above may be used with station 500. A bin 504 of lenses 110 to be tested is provided and the evaluator can individually take a lens 110 from bin 504 and align it on table 502 over a mounting area using guide rails 506 then examine the lens under test 110A over grid 302. If the lens under test 110A does not show at least one significant distortion, change in light intensity or variability in contrast in the image of grid 302, it is considered to be a passed lens and is placed in pass bin 508 for eventual installation into a device. If the lens under test 110A shows at least one significant distortion, change in light intensity or variability in contrast in the image of grid 302, it is considered to be a failed lens and is placed in fail bin 510. Such lens would typically not be installed into a device and may be returned to the supplier. In an alternative system, an automated displacer and conveyor system may be provided to selectively automatically take a lens from bin 504 then convey it over grid 302 for evaluation then selectively place the lens under test in either bin 508 or 510 depending on the decision of the evaluator. Backlight 512 may be provided in table 502 to illuminate the mounting area and grid 302. Also, an automated computer vision system may also be provided to scan the pattern "seen" through lens 110 and assess whether the image seen through lens 110 is acceptable or not.

It will be appreciated that were dimensions are provided, they are provided as approximations and not limitation as understood to those skilled in the art, unless otherwise noted. For example, and not limitation, a range of +/−20% or less or more may be provided to any dimension, when given as an approximation.

Although the disclosure has been described with reference to certain specific embodiments, various modifications thereof will be apparent to those skilled in the art without departing from the scope of the disclosure as outlined in the claims appended hereto.

The invention claimed is:

1. An evaluation device for visually identifying imperfections in a lens for mounting in a case to cover a display of an electronic device, said evaluation device comprising:
   a substrate; and
   a pattern imposed on said substrate, said pattern comprising a series of lines in a grid imposed on the substrate wherein when said pattern is viewed through said lens, said series of lines having thickness of between approximately 10 microns and approximately 150 microns, spaced in intervals between approximately 20 microns and approximately 300 microns from center to center, said pattern is distorted around an area where a defect is present in said lens,
   wherein
   the lens is identifiable as being defective if said pattern appears as a moire distortion in said area when viewed through said lens.

2. The evaluation device of claim 1, wherein the lens is suitable for mounting in the case if said pattern appears to be a grey color when viewed through said lens.

3. The evaluation device of claim 2, wherein:
   said substrate is comprised of one of a transparent material or an opaque material in a light colour; and
   said series of lines shown in a dark colour.

4. The evaluation device of claim 3, wherein said substrate is comprised of one of mylar, glass or plastic.

5. The evaluation device of claim 2, wherein said series of lines is a grid having lines approximately 50 microns thick, spaced in approximately 100 micron intervals from center to center.

6. An evaluation device for visually identifying imperfections in a lens for mounting in a case to cover a display of an electronic device, said evaluation device comprising:
   a substrate; and
   a pattern imposed on said substrate, said pattern comprising a series of geometric shapes, each having dimensions of between approximately 10 microns and approximately 150 microns said pattern is distorted around an area where a defect is present in said lens,
   wherein
   the lens is identifiable as being defective if said pattern appears as a moire distortion in said area when viewed through said lens.

7. The evaluation device of claim 6, wherein the lens is suitable for mounting in the case if said pattern appears to be a grey color when viewed through said lens.

8. The evaluation device of claim 7, wherein:
   said substrate is comprised of one of a transparent material or an opaque material in a light colour; and
   said series of geometric shapes are shown in a dark colour.

9. The evaluation device of claim 8, wherein said substrate is comprised of one of mylar, glass or plastic.

10. An evaluation system to visually evaluate a lens that mounts in a case to cover a display of an electronic device for imperfections, said system comprising:
    an evaluation table for said lens, said table having a mounting area for an evaluation substrate; and
    said substrate having a pattern imposed thereon wherein when said pattern is viewed through said lens, said pattern is seen to be distorted around an area where a defect is present in said lens,
    wherein
    said lens is identifiable as being defective if said pattern appears as a moire distortion in said area when viewed through said lens.

11. The evaluation system of claim 10, wherein said lens is identifiable as being suitable for mounting in the case if said pattern appears to be a grey color when viewed through said lens.

12. The evaluation system of claim 10, wherein said evaluation table further comprises:
    a light mounted within said table to provide backlighting for said substrate; and
    a guide rail system for said lens to place said lens above said mounting area.

13. The evaluation system of claim 12, further comprising a conveyor for said lens to selectively transport said lens to and from said mounting area.

14. The evaluation system of claim 10, wherein:
said substrate is comprised of one of a transparent material or an opaque material in a light colour; and
said pattern is a series of lines shown in a dark colour.

15. The evaluation system of claim 14, wherein said substrate is comprised of one mylar, glass or plastic.

16. The evaluation system of claim 14, wherein said series of lines is a grid having lines having thickness of between approximately 10 microns and approximately 150 microns and the lines are spaced between approximately 20 microns and approximately 150 microns apart.

17. The evaluation system of claim 14, wherein said series of lines is a grid having lines approximately 50 microns thick, spaced in approximately 100 micron intervals from center to center.

18. The evaluation system of claim 10, wherein said pattern is a series of geometric shapes, each having dimensions of between approximately 10 microns and approximately 150 microns.

* * * * *